(12) United States Patent
Sundaresan et al.

(10) Patent No.: US 11,620,462 B2
(45) Date of Patent: Apr. 4, 2023

(54) READING PASSIVE WIRELESS TAGS USING COMMODITY DEVICES

(71) Applicant: NEC Laboratories America, Inc., Princeton, NJ (US)

(72) Inventors: Karthikeyan Sundaresan, Manalapan, NJ (US); Eugene Chai, Monmouth Junction, NJ (US); Sampath Rangarajan, Bridgewater, NJ (US); Mohammad Rostami, Amherst, MA (US)

(73) Assignee: NEC Corporation, Tokyo (JP)

( * ) Notice: Subject to any disclaimer, the term of this patent is extended or adjusted under 35 U.S.C. 154(b) by 148 days.

(21) Appl. No.: 17/202,854

(22) Filed: Mar. 16, 2021

(65) Prior Publication Data

US 2021/0294993 A1 Sep. 23, 2021

Related U.S. Application Data

(60) Provisional application No. 62/991,632, filed on Mar. 19, 2020.

(51) Int. Cl.
| | | |
|---|---|---|
| *G06K 7/10* | (2006.01) | |
| *H04L 27/10* | (2006.01) | |
| *H04W 4/80* | (2018.01) | |

(52) U.S. Cl.
CPC .......... *G06K 7/10366* (2013.01); *H04L 27/10* (2013.01); *H04W 4/80* (2018.02)

(58) Field of Classification Search
CPC ...... G06K 7/10366; H04W 4/80; H04L 27/10
USPC ......................................... 235/451
See application file for complete search history.

(56) References Cited

U.S. PATENT DOCUMENTS

| | | |
|---|---|---|
| 8,274,373 B2 | 9/2012 | Nysen |
| 8,350,665 B1 | 1/2013 | Sundstrom et al. |
| 9,680,533 B2 | 6/2017 | Gudan et al. |
| 9,754,139 B2 | 9/2017 | Chemishkian et al. |
| 2009/0201166 A1 | 8/2009 | Itagaki et al. |
| 2009/0212921 A1 | 8/2009 | Wild et al. |
| 2010/0141383 A1 | 6/2010 | Sano et al. |
| 2010/0309017 A1 | 12/2010 | Ramchandran et al. |
| 2012/0293307 A1 | 11/2012 | Djuric et al. |

*Primary Examiner* — Daniel A Hess
(74) *Attorney, Agent, or Firm* — Joseph Kolodka

(57) ABSTRACT

A method for product tagging is presented including emitting, by at least one RF backscatter transmitter, a dual-tone Radio Frequency (RF) signal embedded within a standardized RF signal on a frequency channel, reflecting and frequency shifting, by a passive RF backscatter tag associated with a product, the dual-tone RF signal to a different frequency channel, and reading, by at least one RF backscatter receiver, the product on the different frequency channel by detecting a distributed ambient backscatter signal generated by a reflection and frequency shifting of the dual-tone RF signal by the passive RF backscatter tag.

19 Claims, 7 Drawing Sheets

READING PASSIVE WIRELESS TAGS USING COMMODITY DEVICES

RELATED APPLICATION INFORMATION

This application claims priority to U.S. Provisional Patent Application No. 62/991,632, filed on Mar. 19, 2020, incorporated herein by reference in its entirety.

BACKGROUND

Technical Field

The present invention relates to wireless communication, and, more particularly, to reading passive wireless tags using commodity devices.

Description of the Related Art

Backscatter is the process of reflecting and modulating the impinging wireless signals using simple tags, of which RFIDs (radio frequency IDs) are a quintessential example. Due to their versatility, portability and low-cost, RFIDs are growing in popularity for backend inventory management, supply chain logistics. etc. However, the need for a separate RFID transceiver/infrastructure has posed a significant impediment for their adoption in consumer spaces, especially homes. Making them viable in consumer spaces has the potential to unlock a whole new paradigm of physical analytics.

SUMMARY

A product tagging system is presented. The product tagging system includes at least one RF backscatter transmitter to emit a dual-tone Radio Frequency (RF) signal embedded within a standardized RF signal on a frequency channel, a passive RF backscatter tag associated with a product to reflect a frequency shift of the dual-tone RF signal to a different frequency channel, and at least one RF backscatter receiver to read the product on the different frequency channel by detecting a distributed ambient backscatter signal generated by a reflection and frequency shifting of the dual-tone RF signal by the passive RF backscatter tag.

A method for product tagging is further presented. The method includes emitting, by at least one RF backscatter transmitter, a dual-tone Radio Frequency (RF) signal embedded within a standardized RF signal on a frequency channel, reflecting and frequency shifting, by a passive RF backscatter tag associated with a product, the dual-tone RF signal to a different frequency channel, and reading, by at least one RF backscatter receiver, the product on the different frequency channel by detecting a distributed ambient backscatter signal generated by a reflection and frequency shifting of the dual-tone RF signal by the passive RF backscatter tag.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to reading passive wireless tags using commodity devices.

One or more embodiments of the present invention provide a novel, battery-less, wireless tag design, referred to herein as "xSHIFT+", that is capable of being illuminated by commodity WIFI devices and whose response can be read by commodity Bluetooth Low Energy (BLE) devices. By achieving operational ranges of 5-10 m between the devices and the tag, xSHIFT+ opens the door to a multitude of practical applications in the fast-growing Internet-of-Things (IoT) industry.

A description will now be given regarding key technical optimizations in xSHIFT+ explained in further detail hereinbelow.

Regarding on-tag BLE packet synthesis for single interface operation, synthesizing BLE packets will be migrated from the WIFI device and instead performed within the tag. The benefits of doing so are the deployment setup will require only "one" WIFI interface at the commodity device for twin carrier generation, the internal interference in the BLE commodity receiver will be eliminated, thereby improving the receiver's sensitivity significantly.

Regarding strong backscatter signal, the first harmonic of the backscatter signal can be used.

Regarding improved throughput through bit-level decoding, the tag can perform bit-level encoding. Hence, the throughput and energy efficiency of the tag is boosted by at least two orders of magnitude. This would only require the storage of a few hundred bits in a permanent memory. These bits are used for synthesizing the desired BLE advertising packet on the tag.

Regarding improved sensitivity through larger frequency shift, the tag is equipped with an ultra-low power, digitally implemented frequency tripler, which triples the frequency of the clock at the output of the delta generator circuit. The output of the frequency tripler is then used for frequency shifting. Since the amount of frequency shift will be large, the main carrier signal will have a much lesser impact on the sensitivity of the BLE receiver.

Regarding easier orchestration of twin-carrier signal, the twin carrier signal (used for frequency shifting clock signal) generated by the WIFI commodity device will no longer have to be as precise as in xSHIFT this allowed xSHIFT to pick only one of the resource units of the entire channel with a special payload for the twin carrier generation. In xSHIFT+, the tag is able to successfully synthesize the BLE signal on the tag and shift its frequency with a rather 'imprecise' clock.

Figure 1:
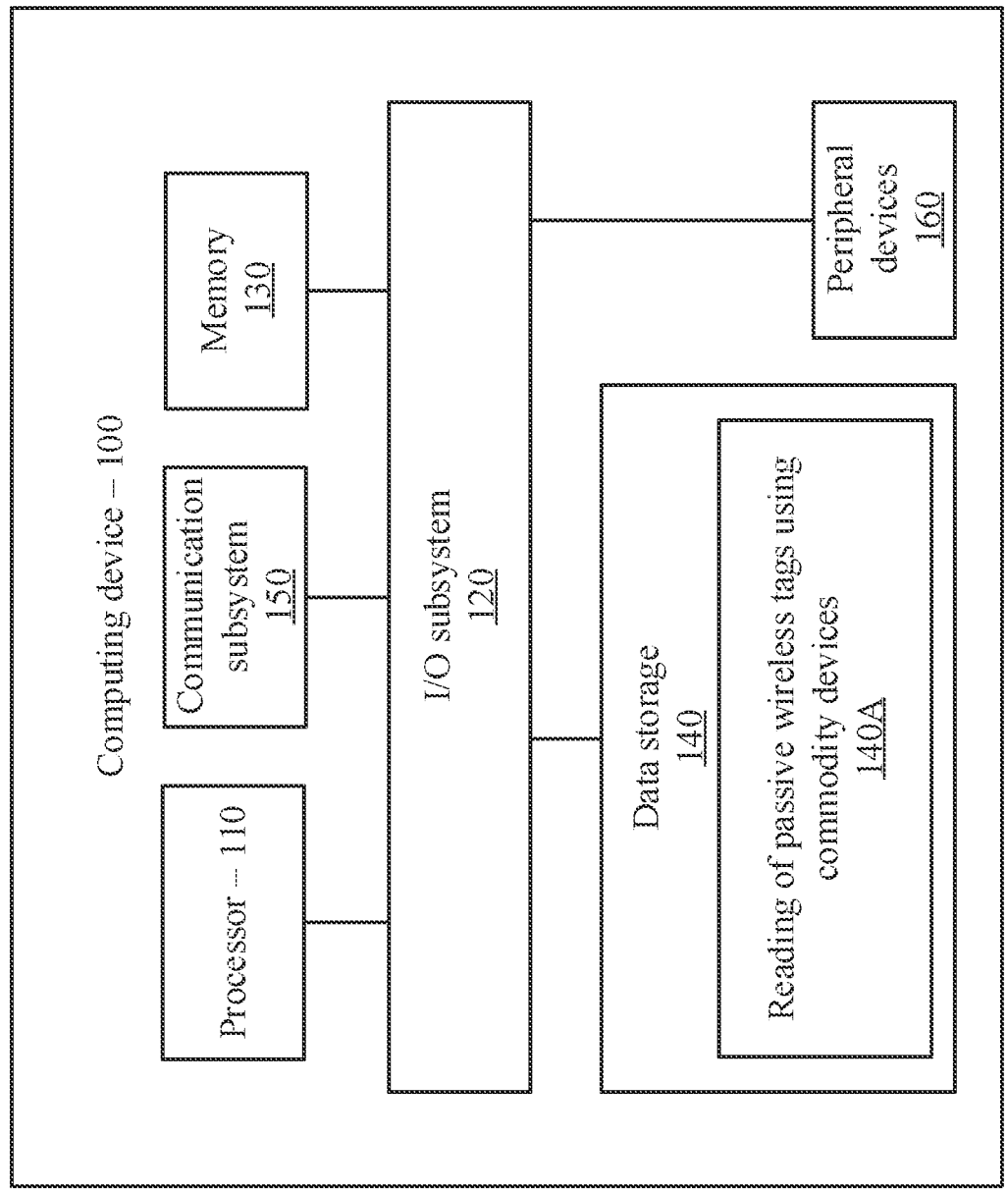
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform reading of passive wireless tags using commodity devices.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for reading of passive wireless tags using commodity devices. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to affect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
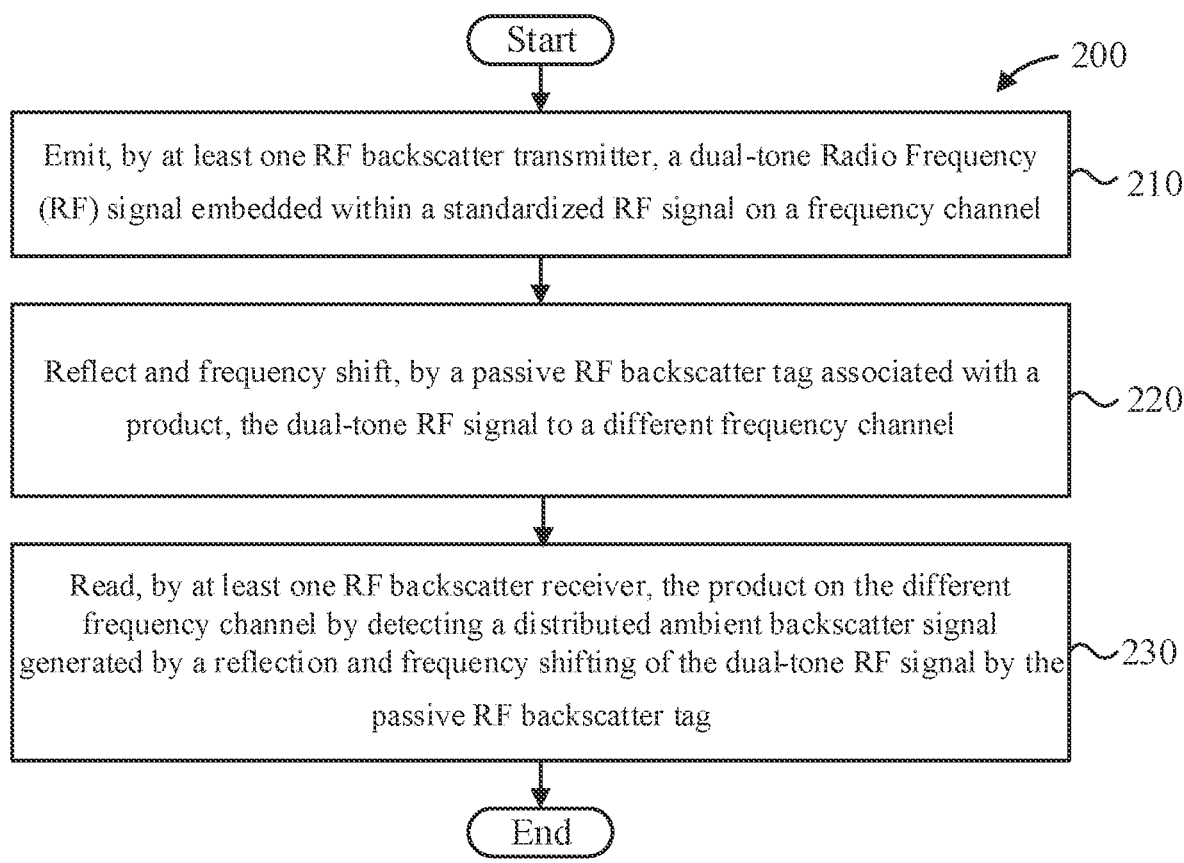
FIG. 2 is a flow diagram showing an exemplary method for reading passive wireless tags using commodity devices, in accordance with an embodiment of the present invention.

FIG. 2 is a flow diagram showing an exemplary method 200 for reading passive wireless tags using commodity devices, in accordance with an embodiment of the present invention.

At block 210, emit, by at least one RF backscatter transmitter, a dual-tone Radio Frequency (RF) signal embedded within a standardized RF signal on a frequency channel.

At block 220, reflect and frequency shift, by a passive RF backscatter tag associated with a product, the dual-tone RF signal to a different frequency channel.

At block 230, read, by at least one RF backscatter receiver, the product on the different frequency channel by detecting a distributed ambient backscatter signal generated by a reflection and frequency shifting of the dual-tone RF signal by the passive RF backscatter tag.

A description will now be given of the design of xSHIFT+, in accordance with an embodiment of the present invention.

To that end, a description of the technical details being xSHIFT+'s optimizations, in accordance with an embodiment of the present invention.

Figure 3:
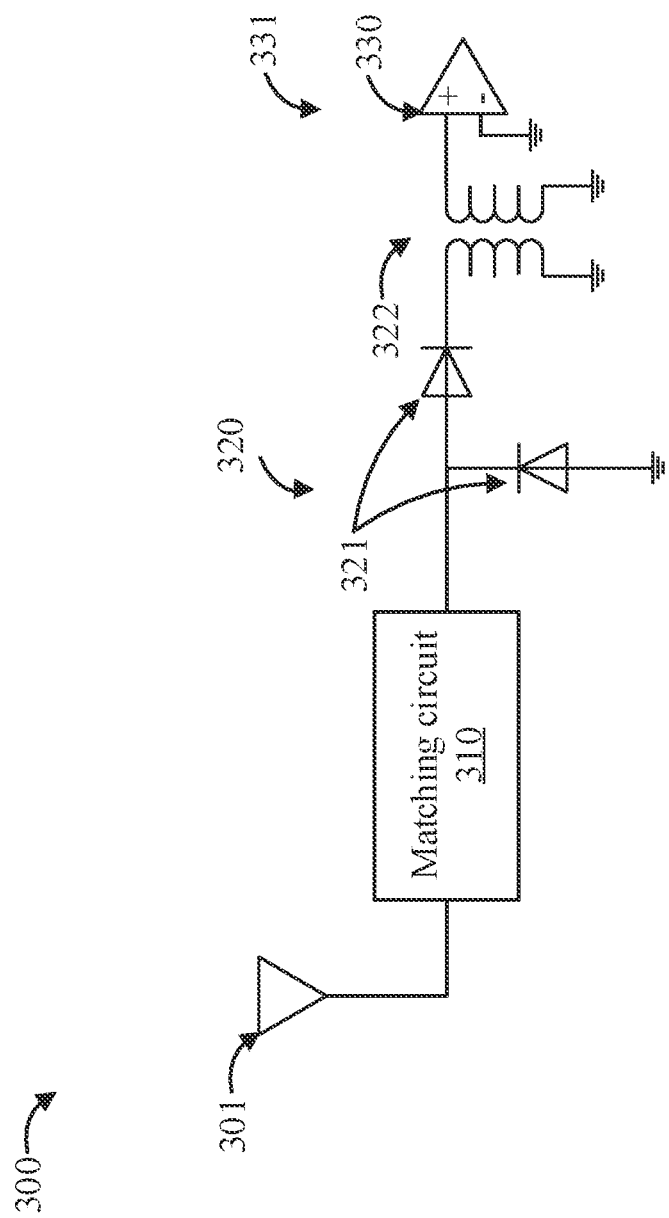
FIG. 3 is a block diagram showing an exemplary delta signal generation circuit, in accordance with an embodiment of the present invention.

FIG. 3 is a block diagram showing an exemplary delta signal generation circuit 300, in accordance with an embodiment of the present invention.

The delta signal generation circuit is responsible for frequency shifting.

The delta signal generation circuit 300 includes an antenna 301, a matching circuit 310, a non-linear device 320, and a magnifier 330.

Regarding matching circuit 310, a matching circuit is employed first to increase the tag's receive sensitivity, e.g., its ability to efficiently receive signal or harvest energy at lower power.

Regarding non-linear device 320, the key step in the delta signal generation process is the conversion of the twin-carrier signal to a sine wave with frequency $\Delta f$. This is accomplished using a Schottky envelope detector 321 followed by a 1:5 impedance transformer 322.

The transformer 322 after the Schottky envelope detector 321, which is a band-pass element around frequency $\Delta f$, not only helps magnify the amplitude of the resulting sine wave, but also eliminates the unwanted terms produced by the envelope detector 321, the most important one being the persistent DC (zero-frequency) component that would otherwise simply overwhelm the signal components in the subsequent stages.

Regarding magnifier 330, the resulting sine wave might still not be strong enough (several mV amplitude at most) to directly drive the backscatter RF switch. Thus, it is converted to a full-swing square wave with frequency $\Delta f$ by means of a micropower Comparator 331. The micro-power comparator 331 is the only active component of the proposed delta generator circuit. It consumes only 16.7 µW during sine-to-square conversion at 1.1 MHz. A user might wonder if the use of this active component jeopardizes a vision for a passive design. It is noted that unlike the oscillators, this comparator does not drain energy for initialization. As long as its supply voltage is available, it is ready to operate. Hence, a functional battery-less tag is still able to be built.

A description will now be given regarding twin-carrier embedding, in accordance with an embodiment of the present invention.

To illuminate the tag with the twin-carrier signal, a signal is created within the payload of a standard WIFI packet that resembles a twin-carrier signal. WIFI standards in use today (802.11b/g/n/ac) are based on OFDM and employ more than two pilot tones in each channel (e.g., 4 pilot tones in a 20 MHz 802.11ac channel). Given these pilots cannot be suppressed, this significantly restricts the capability in generating a clean twin carrier signal. However, the present invention is able to leverage the latest opportunity presented by WIFI's evolution to WIFI 6—OFDMA (orthogonal frequency division multiple access), namely 802.11ax (whose first commercial router release in March 2019) for high-efficiency (HE) WLANs. 802.11ax's OFDMA allows multiple users to share a single channel concurrently by dedicating different portions of the entire channel, called resource units (RUs), to them. The smallest size RU, which is a 26-tone 2.2 MHz sized RU, only has two pilot tones spaced about 1.1 MHz from each other. Hence, if the method can shut down the rest (24) of the sub-carriers, e.g., the data sub-carriers, then the resulting signal can be made to emulate a twin-carrier.

In communication technology, the term "tone" refers to a single frequency, as opposed to a set of frequencies. A set of frequencies is referred to as a "channel."

A description will now be given regarding phase quantization, in accordance with an embodiment of the present invention.

Figure 4:
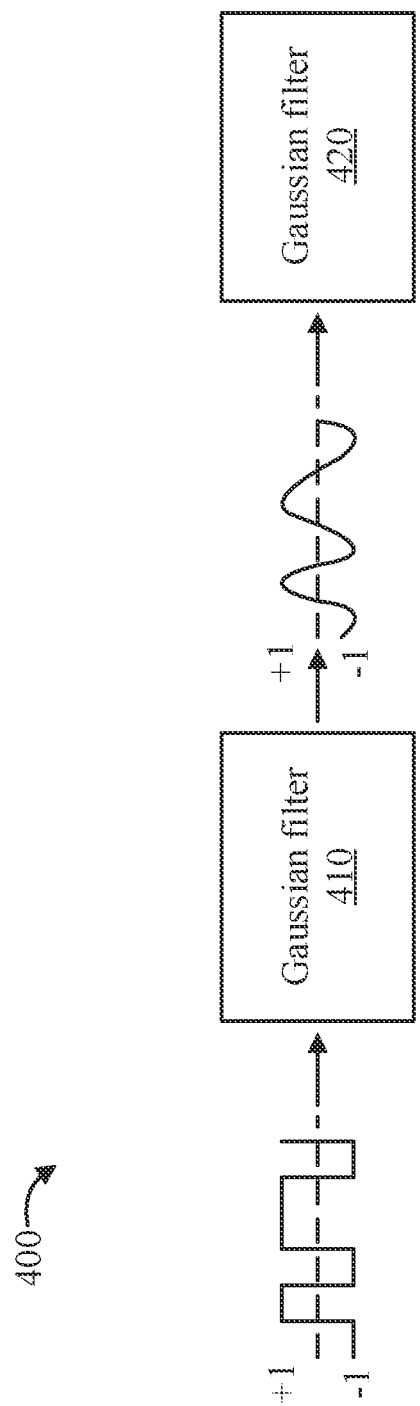
FIG. 4 is a block diagram showing an exemplary Gaussian Frequency Shift Keying (GFSK) modulator pipeline, in accordance with an embodiment of the present invention.

The BLE standard employs Gaussian Frequency Shift Keying (GFSK) for its signals. FIG. 4 is a block diagram showing an exemplary Gaussian Frequency Shift Keying (GFSK) modulator pipeline 400, in accordance with an embodiment of the present invention. The pipeline includes a Gaussian filter 410 and an FM modulator 420.

As shown in FIG. 4, the GFSK used in BLE is essentially a binary FSK signal, where the baseband −1,+1 data sequence is passed through a Gaussian low pass filter to eliminate the high frequency terms that exist in the sharp transitions from −1 to +1 and from +1 to −1, e.g., the rising and falling edges.

If the intention is to leverage the exact same pipeline of FIG. 4 for producing the BLE signal, the tag hardware becomes significantly complex. Hence, xSHIFT+ employs an alternative approach for generating the BLE signal. At a high level, this involves reconstructing the I and Q signals generated at the output of the GFSK modulator with little reconstruction error so that it can be successfully decoded by a standard BLE receiver.

xSHIFT+'s approach is to sample-and-quantize the phase of the GFSK signal. BLE receivers are highly robust against noise. That is, if the amount of noise introduced by reconstruction is less than a certain level, then the receiver can successfully recover the bits in the packet. Further, since the approach introduces phase noise, against which GFSK is very robust, the GFSK signal can be successfully reconstructed by using a few simple LC loads at the backscatter modulator.

To reduce the reconstruction error, the sampling rate should be high enough as well as the phase quantization steps should be small enough. Basically, the sampling rate should not be lower than the Nyquist rate, which is 1 MSamples/sec in this case. However, at this lowest sampling rate, the exemplary methods need fine-grained quantization steps to capture the variations of phase (because of frequency change) across time. As the exemplary methods increase the sampling rate, coarser quantization steps can be used to capture the variations.

A description will now be given regarding design and practical challenges, in accordance with an embodiment of the present invention.

Implementing the phase quantizer with off-the-shelf components encounters the following design tradeoffs. With the typical tolerance of LC values (for LC impedance loads), only quantization steps as small as $\pi/4$ can be implemented. This means that if the exemplary methods choose steps smaller than $\pi/4$, the inaccuracy of the LC values cannot be tolerated.

Ultra-low power RF switches in the market are at max 1:4 (1 input and 4 output ports). So, if the number of quantization steps is greater than 16, the FS backscatter modulator which is in the shape of a tree would include at least 3 stages of ultra-low power RF switches and will suffer from a significant insertion loss.

The smaller the number of steps, the fewer the number of impedance loads and the smaller the memory needed to store the phase quantization values. This suggests choosing quantization steps of $\pi/4$. Additionally, an advantage includes using symmetrical phase values to boost the frequency shifting backscatter signal.

xSHIFT+'s new method of backscattering needs to use a different backscatter modulator hardware. Essentially, it needs to configure a number of RF switches such that they can do the dual task of phase reconstruction as well as frequency shifting.

Regarding hard coding in memory, note that phase quantization is performed in advance in a computing device to obtain the samples that will be stored in the memory of the tag permanently. When the tag wants to reconstruct the phase of the BLE signal, it just needs to connect the antenna to the right impedance according to a value of the memory cell that stores the quantized phase at each sample time.

The present invention uses, e.g., eight different impedance values, each associated with one of the following phase values (the values are in radians): 0, $\pi/4$, $\pi/2$, $3\pi/4$, $\pi$, $5\pi/4$, $3\pi/2$, $7\pi/4$. Depending on the phase value, the present invention either uses open circuit, short circuit, or a single capacitor or inductor as the impedance that creates the phase difference.

The goal is that switching to impedance $Z_i$ results in $\Delta_\phi = \phi_{reflected} - \phi_{incoming} = (i-1) \times \pi/4$. Therefore, if the phase of the incoming signal remains the same during the reconstruction of the BLE signal, this would result in a reconstruction with a constant phase offset that does not impact decodability. The assumption of a constant incoming phase holds true given the fact that the total period of a BLE advertising packet is only a small fraction of a millisecond.

Regarding phase to impedance mapping, the following setup is used to find the right impedance values at each output of the switch. The impedance at the first port of the switch needs to be open circuit ($Z_0$=O.C.), as open circuit creates zero phase difference between the reflected and the incoming signals. Then, toggling is performed between the zero and i-th ports periodically and the reflected signal coming out of the circulator is observed in, e.g., a software program such as MATLAB. Different cycle times are intentionally chosen for the two ports to be able to distinguish between them.

First, the exemplary methods find the theoretical values of L (for $0<\Delta_\phi<\pi$) and C ((for $\pi<\Delta_\phi<2\pi$)). Note also that the port associated with a $\pi$ radians phase difference needs to be terminated with short circuit. Hence, for short circuit load, the exemplary methods have $\Delta_\phi=\pi$; for open circuit load, $\Delta_\phi=0$; for inductive load, $\Delta_\phi=\pi-2$ arctan $$\left(\frac{2\pi f L}{Z_0}\right);$$

and for capacitive load, $\Delta_\phi=2\pi-2$ arctan($2\pi$ f $CZ_0$); where $Z_0$=50Ω, and f is the frequency of the backscatter carrier.

Finally, using the theoretical values of L and C as initial values, their appropriate values that result in a phase shift that is as close as possible to the target phase shift are empirically found.

Regarding memory to switch connection, after finding the right values, xSHIFT+ reconstructs the phase quantized BLE signal. It has to only convert the discrete phase values to 3-bit vectors and finally feed the 3-bit control pins of the SP8T switch with the obtained vector and with clock rate being exactly equal to the phase quantization sampling rate.

xSHIFT+ replaces the SP8T switch in the above hardware configuration with two ultra-low power SP4T (1:4) switches, each of which is connected to four of the complex loads. Note that in contrast to SP8T, ultra-low power SP4T RF switches are available in the market.

Figure 5:
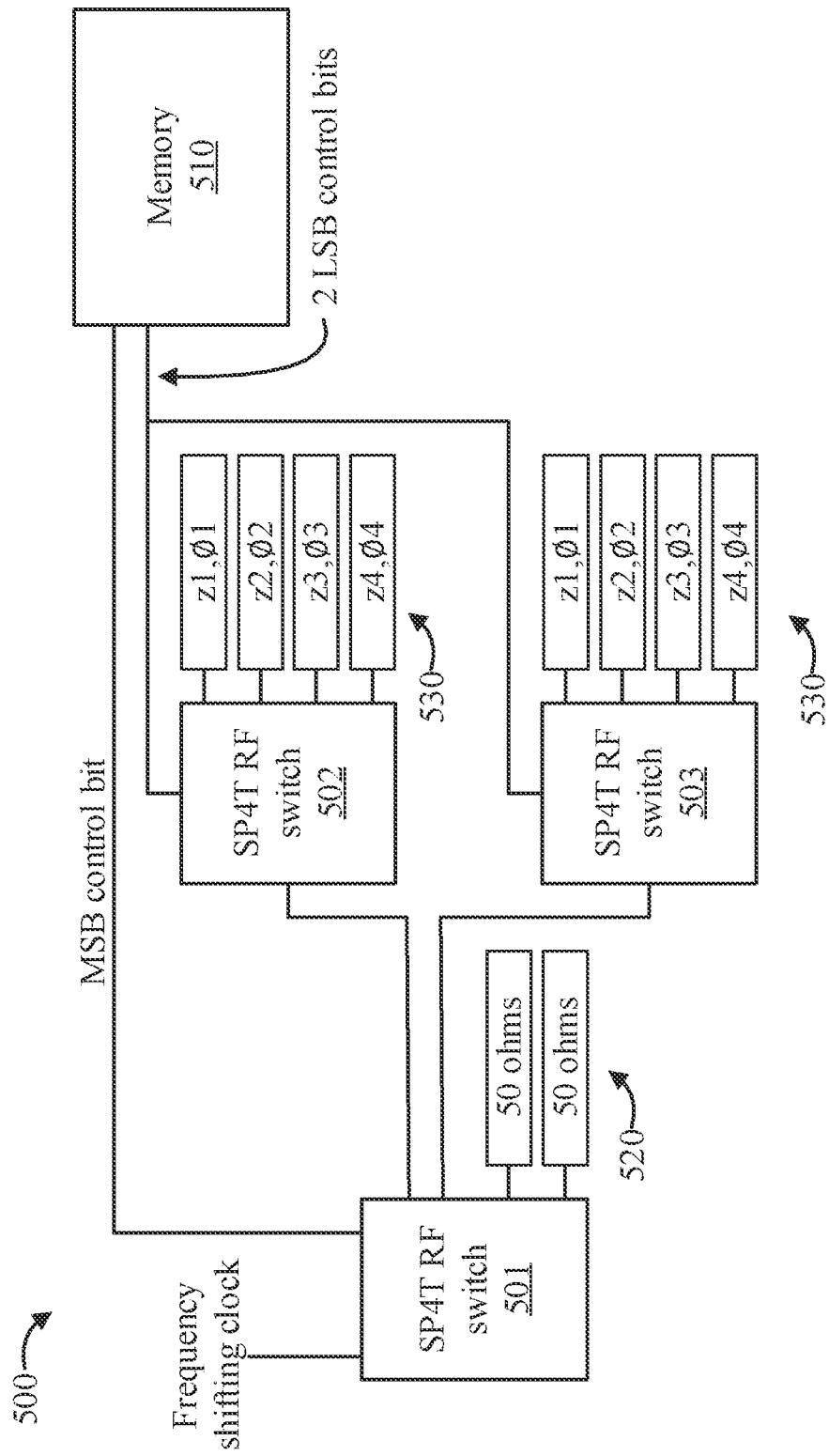
FIG. 5 is a block diagram showing exemplary uni-polar frequency shifting, in accordance with an embodiment of the present invention.
Figure 6:
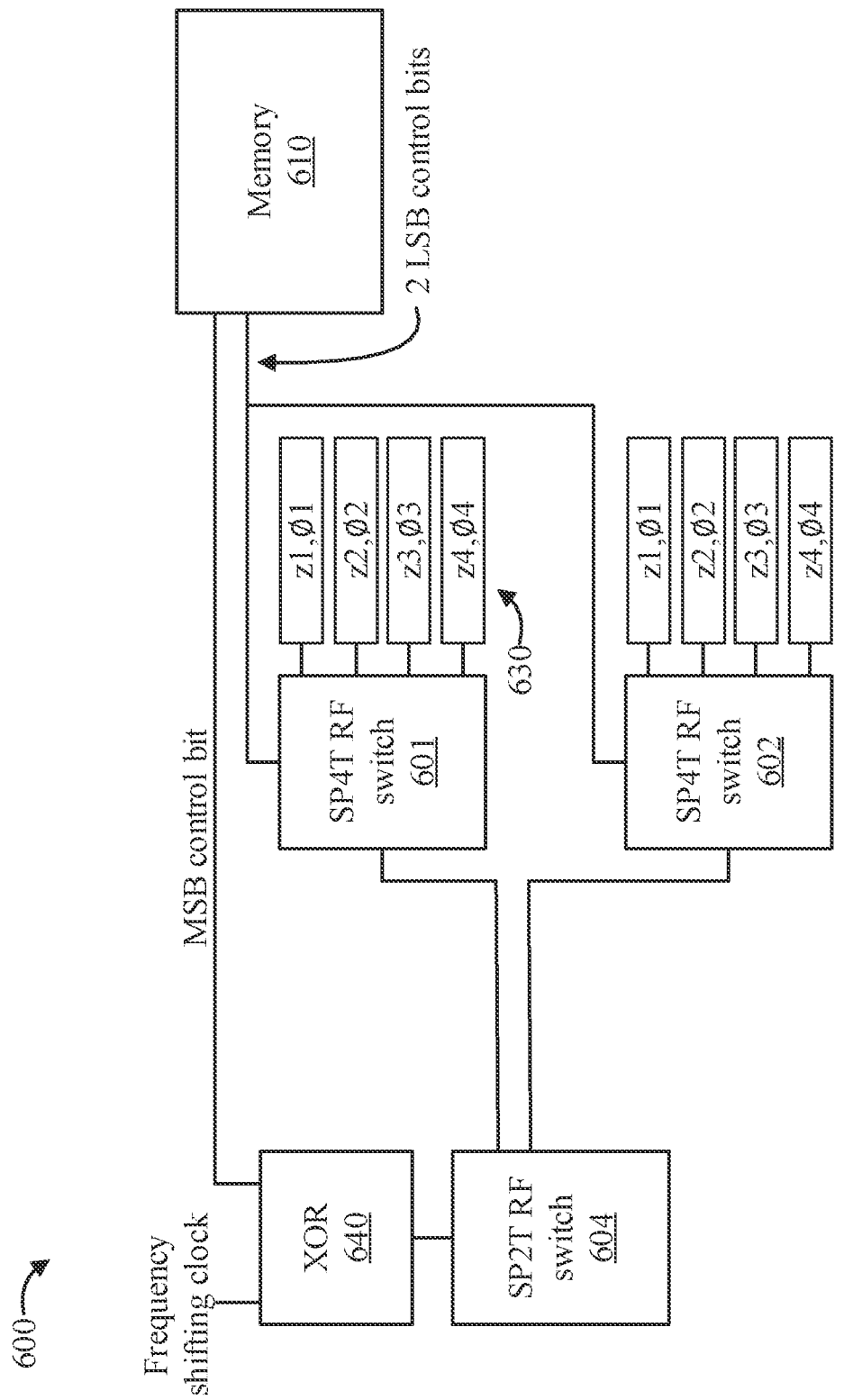
FIG. 6 is a block diagram showing exemplary bipolar frequency shifting, in accordance with an embodiment of the present invention.

Regarding bipolar frequency shifting, xSHIFT+ obtains an additional 9 dB gain in the backscatter signal strength by replacing the uni-polar frequency shifting (FIG. 5) configuration with a uni-polar configuration (FIG. 6).

FIG. 5 is a block diagram showing exemplary uni-polar frequency shifting 500, in accordance with an embodiment of the present invention. Uni-polar frequency shifting 500 involves 3 SP4T RF switches 501, 502, and 503, a memory 510, 50-ohm terminations 520, and other terminations 530.

FIG. 6 is a block diagram showing exemplary bipolar frequency shifting 600, in accordance with an embodiment of the present invention. The bi-polar frequency shifting 600 involves 2 SP4T switches 601 and 602, a DSP2T switch 604, a memory 610, terminations 630, and an exclusive OR (XOR) 640.

Bi-polar applies the two following changes to the uni-polar frequency shifting: instead of using a SP4T as the intermediate (frequency shifter) switch, the exemplary methods use a SP2T switch, and instead of toggling between the phase and 50Ω, the intermediate switch toggles between the phase and its image (opposite) at rate $\Delta f$. This is accomplished by XORing the MSB of the phase control vector with the $\Delta f$ frequency shifting clock.

6 dB of the afore-mentioned 9 dB gain comes from the fact that uni-polar method was employing half-swing FS backscatter (e.g., signal swings between 0 and +1), whereas bi-polar method is a full-swing FS backscatter (signal swings between −1 and +1). In fact, in the half-swing backscatter, ½ of the total incoming power is wasted on the 50Ω termination and ¼ goes to the DC term of the backscatter signal, which is radiated at the exact same frequency as the incoming carrier. Thus, only ¼ of the total incoming signal goes to the frequency shifted backscatter signal at frequency f±$\Delta f$ (assuming higher order harmonics are negligible). In contrast, in the full swing FS backscatter, the whole power goes to the backscatter signal at frequency f±$\Delta f$ (assuming higher order harmonics are negligible). This results in 4× or 6 dB improvement in backscatter signal strength.

The other 3 dB comes from the fact that SP4T has about 1.5 dB more insertion loss than SP2T at 2.4 GHz band. Since the backscatter process involves a round-trip over the RF switch, using SP2T instead of SP4T at 2.4 GHz results in a 1.5 dB+1.5 dB=3 dB stronger backscatter signal.

Regarding memory, implementing xSHIFT+'s phase quantization approach requires sufficient memory within the tag to store the values of the 3-bit phase control vectors.

A description will now be given regarding main carrier interference, in accordance with an embodiment of the present invention.

Synthesizing BLE packets within the tag through phase quantization removes the inter-modulation interference effect that existed in the previous version of xSHIFT. Therefore, the exemplary methods would no longer need to rely on the third harmonic of the backscattered signal and can directly leverage the first harmonic, e.g., a 10 dB boost in backscatter received signal strength (RSS). However, the value of $\Delta f$ cannot be arbitrarily small. Otherwise, the backscattered signal would be interfered by the tail of the emulated, non-ideal twin carrier signal from the commodity device.

Experimental results show that $\Delta f$ needs to be greater than 3 MHz for an acceptably low interference from the tail of the twin carrier signal. Since the 26-tone resource units in WIFI 6 only allows us to use twin carriers with a $\Delta f \approx 1.1$ MHz, xSHIFT+'s tag needs to triple the frequency of the delta signal generated at the output of its delta generator to obtain the desired 3.3 MHz frequency shifting.

Regarding frequency tripler, for tripling the frequency of the delta signal, the square wave at the output of the delta generator is delayed using passive RC components and two extra comparators to create 16-cycle and 26-cycle delayed versions of it. Then, a 3-input XOR logic circuit takes these three square waves, and produces an output that has 3× the frequency of the original square wave.

Regarding 802.11ax RU selection, there is no concern whether the selected resource unit can result in a clean twin carrier signal. Hence, the location of the central 26-tone resource unit (fifth 26-tone RU) would not pose a problem for the generation of the twin carrier signal and the resulting quality of the generated delta square wave.

A description will now be given regarding non-ideal twin carrier compensation, in accordance with an embodiment of the present invention. The non-ideal twin carrier emulated by the WIFI signal in the commodity device results in a corrupted (dirty) clock signal at the output of the delta generator, e.g., a clock including some jitter and timing error. If this clock is used for BLE phase quantization and frequency shifting, this would result in a significant error in the reconstructed signal, which in turn cannot be decoded by a BLE receiver. xSHIFT+'s idea is to reverse-engineer and find the baseband signal, which will produce the desired BLE backscatter signal if it is phase quantized and frequency shifted with the corrupted clock. The baseband signal that is adopted is obtained by taking the complex inverse of the IQ values of the output that is generated by feeding the BLE signal to the non-ideal modulator. Then, the exemplary methods employ a low pass filter and phase quantize this signal to obtain the desired baseband signal. It is noticed that there might also exist a small frequency deviation since the left pilot tone may not be exactly $\Delta f$ away from the center of the BLE channel. This can also be captured and addressed using the above reverse-engineering method, e.g., taking into account the frequency deviation of the BLE signal as well, when calculating the baseband signal.

If it is observed that the corrupted clock generated at the output of xSHIFT+'s delta generator is corrupted beyond a certain amount (ppm), then the calculated baseband signal needs to be phase quantized at a higher rate and yet quantizing it with the dirty clock itself can fail. Even in this worst-case scenario, it is observed that phase quantizing with the output of the frequency tripler can work. This, however, increases the number of samples that need to be stored in the memory of the tag as well as the power consumption of the phase quantizer. Particularly, size can be a challenge when implementing the PCB prototype since the ultra-low power FPGAs and CPLDs have limited resources that would not allow a large number of samples to be stored, the exemplary methods would need to select power-hungry versions that offer more resources. One solution is to find an appropriate WIFI payload (resource unit) that will not result in the above problem. In other words, the resulting delta square wave (clock signal) is clean enough for phase quantization.

A description will now be given regarding applications to which the present invention can be applied, in accordance with an embodiment of the present invention.

Regarding inventory and asset management, xSHIFT+'s tags can be attached to everyday products in the kitchen to aid in inventory tracking. A smart home device sitting on the kitchen counter, can serve as the WIFI transceiver illuminating the tags. An app (integrated with Amazon Alexa®, Google Home®, etc.) running on the user's phone is responsible for automatically reading and tracking products in the kitchen shelves, pantry, etc. as and when the user moves around the kitchen, without his/her explicit intervention. Beyond convenience to the user, such product consumption information is highly valuable for retailers in optimizing and enhancing the omni-channel shopping experience for their users. An analogous application can be envisioned for asset management in warehouses, where retailers can leverage their existing WIFI infrastructure to track assets as workers move around the warehouse with phones.

Regarding product localization, another interesting application, is tracking the location of often-misplaced objects in homes and enterprises. Whenever a user moves in close proximity (1-2 m) of the tagged object, he/she can be notified of the object's presence through an app on the phone.

Regarding passive beacons, a beacon is a BLE device that permits a business to provide certain location-based services to their customers. Beacons provide an edge over GPS services, in that, they do not need any type of satellite, and they provide location services indoors and even outdoors. The basic method that is in charge of the functioning of beacons is identified as advertising. In this method, the devices emit packets of data using BLE and other encoding devices nearby, such as smartphones that are in the vicinity, identify this data.

With xSHIFT+, the exemplary methods aim to enable such applications with battery-free tags. This results in easier deployment—xSHIFT+'s paper-type tags can adhere to any surface and any object, scalability—since the cost of passive tags is much less than a beacon device (100×-1000× less), they can be deployed on everyday objects and products at a large scale, and endurance—eliminates the need for battery replacement.

Figure 7:
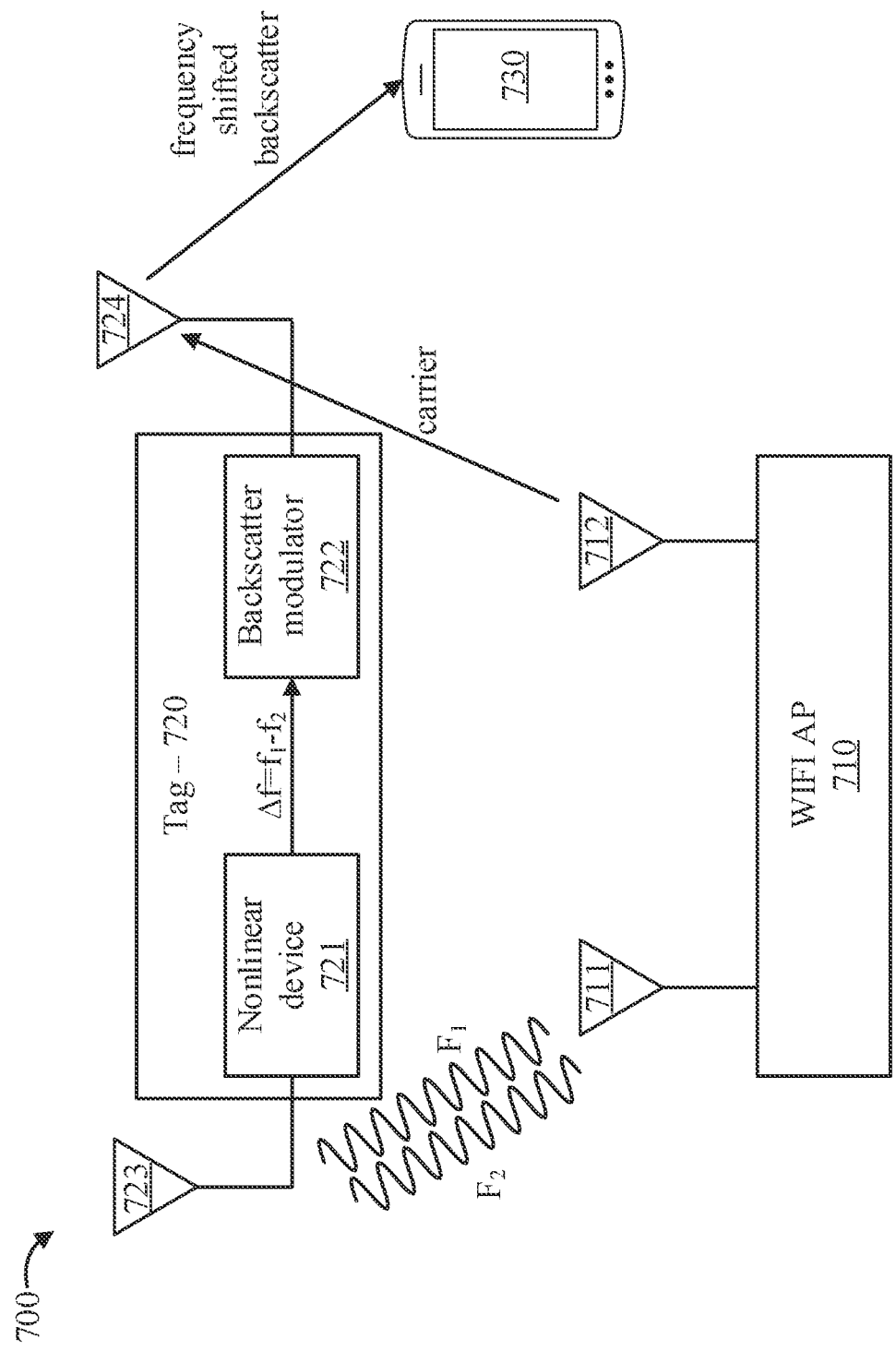
FIG. 7 is a block diagram showing exemplary XSHIFT+ backscatter system, in accordance with an embodiment of the present invention.

FIG. 7 is a block diagram showing exemplary XSHIFT+ backscatter system 700, in accordance with an embodiment of the present invention.

The system includes a commodity WIFI Access Point (AP) 710, a tag 720, and a user device 730. In an embodiment, the user device 730 is a smart phone. In other embodiments, it can be laptop, tablet, and so forth.

The tag 720 includes a non-linear device 721, a backscatter modulator 722, and antennas 723 and 724.

The tag 720 takes the twin carrier signal embedded in the WIFI packet transmitted by one of the antennas 711 and 712 of the commodity WIFI device 710 (e.g., access points, smart voice assistants, smart TVs, smartphones, etc.) and uses it for several purposes, such as, as the delta signal for FS backscatter after passing through its delta generator and frequency tripler, as the clock for the logic circuit that performs phase quantization immediately after passing through the delta generator, and one of the tones (the one that is closer to the BLE advertising channel) as the carrier signal for FS-backscatter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A product tagging system, comprising:
   at least one RF backscatter transmitter to emit a twin-carrier Radio Frequency (RF) signal;
   a passive RF backscatter tag including a nonlinear device and a backscatter modulator to convert the twin-carrier RF signal to a single output frequency signal by using a difference between frequencies of the twin-carrier RF signal; and
   at least one RF backscatter receiver to read a product by detecting a distributed ambient backscatter signal generated by a reflection and frequency shifting of the RF signal by the passive RF backscatter tag.

2. The product tagging system of claim 1, wherein the passive RF backscatter tag frequency shifts and backscatters the RF signal from the at least one RF backscatter transmitter onto a different orthogonal channel for reception by the at least one RF backscatter receiver.

3. The product tagging system of claim 1, wherein the at least one RF backscatter transmitter and the at least one RF backscatter receiver coordinate usage of two channels for backscattering, with one channel employed for transmission and the other channel employed for reception.

4. The product tagging system of claim 3, wherein transmission from the at least one RF backscatter transmitter includes the RF signal needed for shifting a frequency of the distributed ambient backscatter signal by the passive RIF backscatter tag.

5. The product tagging system of claim 1, wherein the passive RF backscatter tag generates the distributed ambient backscatter signal as fundamental frequency shift signals and harmonic frequency shift signals.

6. The product tagging system of claim 5, further comprising a tuning circuit, coupled to an antenna, followed by an envelope detector, a transformer and a comparator, to amplify at least one of the harmonic frequency shift signals.

7. The product tagging system of claim 5, wherein the passive RF backscatter tag modulates a target bit sequence.

8. The product tagging system of claim 7, wherein the target bit sequence is generated by a quantizing phase of a target Gaussian Frequency Shift Keying (GFSK) signal that includes a target Bluetooth (BLE) signal.

9. The product tagging system of claim 8, wherein the quantizing phase is accomplished by switching between different impedance states using at least one RF switch in the passive RF backscatter tag.

10. The product tagging system of claim 7, wherein a frequency tripler is employed to enable a larger frequency shift to the backscattered signal to reduce interference at the at least one RF backscatter receiver.

11. The product tagging system of claim 1, wherein one of the at least one RF backscatter transmitter and the at least one RF backscatter receiver are hosted in a same mobile or stationary device in a mono-static configuration.

12. The product tagging system of claim 1, wherein one of the at least one RIF backscatter transmitter and the at least one RF backscatter receiver are hosted on two separate devices in a bi-static configuration.

13. The product tagging system of claim 1, wherein the passive RF backscatter tag stores information and modulates the RF signal to convey information to the at least one RF backscatter receiver.

14. The product tagging system of claim 1, wherein the at least one RF backscatter transmitter and the at least one RF backscatter receiver are embodied in existing re-purposed devices for a purpose other than tagging products.

15. The product tagging system of claim 1, wherein a plurality of channels used for backscatter transmission and reception are embodied in standardized RF channels available in commodity devices.

16. A method for product tagging, comprising:
   emitting, by at least one RF backscatter transmitter, a twin-carrier Radio Frequency (RF) signal;
   converting, by a passive RF backscatter tag including a nonlinear device and a backscatter modulator, the twin-carrier RF signal to a single output frequency signal by using a difference between frequencies of the twin-carrier RF signal; and
   reading, by at least one RF backscatter receiver, a product by detecting a distributed ambient backscatter signal generated by a reflection and frequency shifting of the RF signal by the passive RF backscatter tag.

17. The method of claim 16, wherein the passive RF backscatter tag modulates a target bit sequence, the target bit sequence generate by a quantizing phase of a target Gaussian Frequency Shift Keying (GFSK) signal that includes a target Bluetooth (BLE) signal.

18. The method of claim 16, wherein the at least one RF backscatter transmitter and the at least one RF backscatter receiver coordinate usage of two channels for backscattering, with one channel employed for transmission and the other channel employed for reception.

19. The method of claim 16, wherein one of the at least one RF backscatter transmitter and the at least one RF backscatter receiver are hosted on two separate devices in a bi-static configuration.

* * * * *